United States Patent Office 3,740,193
Patented June 19, 1973

3,740,193
HYDROGEN PRODUCTION BY CATALYTIC STEAM GASIFICATION OF CARBONACEOUS MATERIALS
Clyde L. Aldridge and David Buben, Baton Rouge, La., and Ronald S. Goldberg, Hanover, N.H., assignors to Esso Research and Engineering Company
No Drawing. Filed Mar. 18, 1971, Ser. No. 125,821
Int. Cl. C10j 3/00
U.S. Cl. 48—202
9 Claims

ABSTRACT OF THE DISCLOSURE

A hydrogen-rich gaseous stream is produced by contacting in a reaction zone operating at superatmospheric pressures and temperatures between 1000 and 1500° F. a carbonaceous material with steam introduced in the reaction zone at a rate between 1.0 and 10.0 weight $H_2O$/weight carbon/hr. in the presence of a catalyst composition comprising cesium carbonate.

BACKGROUND OF THE INVENTION

This invention relates to a novel and improved process for producing hydrogen-rich gases. More particularly, this invention relates to a process wherein carbonaceous materials are steam gasified at temperatures below 1500° F. in the presence of a novel and improved catalytic composition to produce hydrogen-rich gas.

With the increasing need for hydrogen in the refining of petroleum and for the production of synthetic fuels, it has become desirable to find a new economic source of hydrogen-rich gas. One possible source would be through steam gasification of carbonaceous materials, in particular sulfur-containing materials such as coke.

One known process for steam gasification of carbonaceous material utilizes a catalyst composition comprising nickel, cobalt, or iron activated by metallic compounds such as chromium, vanadium, or alkali metals. However, these catalytic compositions have proved very inefficient when the carbonaceous feed contains more than 2000 p.p.m. of sulfur. For this reason steam gasification of crude residua, coal char, petroleum bottoms, coke, and similar materials which contain appreciable amounts of sulfur has not been a commercial success with these catalysts. Even at temperatures of 1800° F. the sulfur in these feeds destroys the catalytic effect of these earlier catalytic compositions.

Another process known in the art, as described in U.S. Pat. 3,252,773, to produce hydrogen by steam gasification of carbonaceous material utilizes, preferably, a sodium or potassium carbonate catalytic molten salt bed. This art teaches that as the temperature of the molten bed decreases the rate of hydrogen production also decreases because less steam reacts with the carbon in the carbonaceous materials to produce hydrogen. As a result the prior art catalytic molten beds must be operated above 1500° F., and more preferably above 1800° F., in order to obtain enough hydrogen to be commercially successful. To operate at such high temperatures requires that large quantities of heat be put into the molten bed since the steam-carbon reaction $$H_2O + C \rightleftharpoons H_2 + CO - 56{,}572 \text{ B.t.u.}$$

is highly endothermic. This is a very expensive requirement and any new process or catalyst system that could reduce the heat requirement would be of extreme economic importance.

This difficulty has been recognized by industry, but attempts such as using a lower melting eutectic mixture for the molten bed have not been successful. Even the most successful previously known eutectic mixtures; e.g., sodium carbonate and sodium hydroxide, sodium carbonate and lithium carbonate, sodium carbonate and potassium hydroxide, sodium carbonate and sodium nitrate, or potassium carbonate and lithium carbonate, have not enabled industry to economically produce enough hydrogen at temperatures below 1500° F.

Another difficulty that has arisen in the prior art processes, particularly with those processes where the molten bed is formed of eutectic mixtures such as the above, is that some of the compounds comprising the eutectic mixture are not stable under the process conditions and within a short time decompose to stable compounds. For example, the sodium carbonate-sodium hydroxide mixture is very unstable and after a period of about twenty minutes the sodium hydroxide reacts with the gaseous products in the reaction zone and forms sodium carbonate, thus forming a pure sodium carbonate bed which is not molten unless the temperature in the reaction zone is increased substantially.

It is therefore an object of this invention to provide a process for economically producing hydrogen by steam gasification of carbonaceous materials which can be operated at temperatures less than 1500° F. by virtue of a highly active novel catalyst system.

Another object of this invention is to provide a process for economically producing enough hydrogen by steam gasification of carbonaceous materials where the catalyst systems utilized are stable for long periods of time.

These and other objects will become apparent from the subsequent description of the invention.

SUMMARY OF THE INVENTION

By injecting steam at a rate of 1.0 to 10.0 weight $H_2O$/weight carbon/hour into a reaction zone containing a carbonaceous material such as petroleum coke and operating at superatmospheric pressures and temperatures ranging between 1000 and 1500° F., hydrogen may be produced at rates 50 to 400% higher than those obtained with previous steam gasification processes provided the catalyst composition in the reaction zone comprises $Cs_2CO_3$.

PREFERRED EMBODIMENT OF THE INVENTION

As stated previously there is a great need in the petroleum industry for a new economic source of hydrogen. One way to produce hydrogen is to steam gasify materials containing carbon. The carbon will react with the steam to produce hydrogen and carbon monoxide:

$$C + H_2O \rightleftharpoons H_2 + CO$$

If excess steam is present the CO will react with it to produce more hydrogen as well as carbon dioxide:

$$CO + H_2O \rightleftharpoons H_2 + CO_2$$

Therefore any carbonaceous material could be used in this process. This would include various grades of coal, petroleum coke, coal coke, peat, graphite, charcoal, wood and waste products, non-woody plant material such as bagasse and cotton stalks, sugar and cellulose waste. Also petroleum or other hydrocarbonaceous fractions such as whole and reduced crudes, residua, natural tars such as Athabasca tar, coal distillates or tars, steam-cracked tar, H-Oil bottoms, etc. may be used. However, in petroleum refineries utilizing coking reactors, it would be preferred to use the coke generated to produce the hydrogen necessary in other refinery operations since the hydrogen produced is more valuable than the coke. For this reason the carbonaceous material in the preferred embodiment will be coke, although any carbonaceous material could be used in the process of this invention.

The coke is injected into a reaction zone so as to contact a catalytic composition at temperatures between 1000° and 1500° F., preferably between 1200° and 1400° F., and most preferably 1250° to 1350° F. and at superatmospheric pressures preferably between 150 and 2000 p.s.i.g., more preferably between 300 and 1000 p.s.i.g., and most preferably between 700 and 850 p.s.i.g., and in the presence of steam. The steam is introduced at a rate between 1.0 and 5.0 wt. H₂O/wt. carbon/hour, and most preferably between 1.0 and 3.0 wt. H₂O/wt. feed/hour.

The coke and catalyst mixture may be maintained as a fixed bed, moving bed, fluidized bed or molten bed depending on the catalyst composition. When the $Cs_2CO_3$ is mixed with certain alkali metal salts such as CsCl or $Li_2CO_3$ the reaction zone bed may be maintained as a molten bed at the operating conditions. When using a molten bed the weight ratio of catalyst to coke is between 3:1 to 100:1, preferably 5:1 to 50:1.

At 1000°–1500° F., the mixture of either CsCl or $Li_2CO_3$ with $Cs_2CO_3$ results in a molten catalyst composition that not only gives high reaction rates, but also is stable for much longer periods of time when compared to other alkali metal salt mixtures. Best results are achieved when the cesium carbonate comprises 60 to 40 mole percent of the mixture, and the cesium chloride or lithium carbonate comprises 40 to 60 mole percent of the mixture.

To form the catalytic mixture the cesium carbonate is preferably mixed with either the cesium chloride or lithium carbonate in the desired amounts referred to above.

Example I

This example makes a comparison between the catalytic activity of cesium carbonate and of molten mixtures of cesium carbonate with either cesium chloride or lithium carbonate.

The data in Table I was obtained by heating a reactor vessel containing the catalyst composition to a temperature of 1050 F. Coke was then introduced into the reactor along with steam in proportions so that the weight of steam to weight of coke per hour was between 1.7 and 3.4. The process took place under a pressure of 150 p.s.i.g. The following results were obtained.

TABLE I

| Run No. | Catalyst | Relative rate [1] | Stable |
|---|---|---|---|
| 1 | $Cs_2O_3$, solid | 1.00 | Yes. |
| 2 | 50-50 mole percent $Cs_2CO_3$-CsCl, melt | 0.87 | Yes. |
| 3 | 60-40 mole percent $Cs_2CO_3$-$Li_2CO_3$, melt | 0.78 | Yes. |

[1] "Relative rate" is the ratio of the reaction rate of the particular run to the reaction rate of the standard run (in this case Run Number 1).

Surprisingly, however, cesium carbonate cannot be combined with many other alkali metal salt compounds to form low melting mixtures which are stable under the reaction conditions, i.e. in the presence of steam and carbon dioxide at these elevated temperatures as is seen by the following data in Example II.

Example II

The data in Example II was obtained by the same procedure and under the same conditions as in Example I.

TABLE II

| Run No. | Catalyst | Relative rate [1] | Stable |
|---|---|---|---|
| 4 | $Cs_2CO_3$-CsF, melt | 1.0 | No. |
| 5 | $Cs_2CO_3$-CsOH, melt | 1.1 | No. |

The standard run was Run Number 1.

These results indicate that while some catalyst systems may demonstrate high catalytic activity they are not practically applicable because of instability. In particular this data indicates that the utility of certain catalyst systems cannot be predicted. For instance, in Example I the data indicates that a $Cs_2CO_3$—CsCl mixture would serve as an excellent catalyst system; yet, in Example II $Cs_2CO_3$—CsF would not be a good catalyst since it is unstable.

Example III

As stated previously it is known in the art to use alkali metal carbonates as steam gasification catalysts, but that at temperatures below 1500° F. all previous reports indicate that the alkali metal carbonates do not possess enough activity to raise the hydrogen production to a level sufficient to make processes operating below 1500° F. economicaly feasible. We have now found that for some reason cesium carbonate has a much higher catalytic activity at lower temperatures than do either of the best known catalysts, i.e., potassium carbonate and sodium carbonate. This is indeed surprising in light of the known art which teaches that cesium carbonate is unstable and has a poorer activity than either potassium carbonate or sodium carbonate at these temperatures.

The following data was obtained by the same procedure used in Example I except that the pressure was maintained between 700 and 800 p.s.i.g., and the weight of steam per weight of coke per hour was 4.0. The catalysts were present in molar equivalent amounts (2 g. atom percent alkali metal on carbon).

TABLE III

| Temperature (° F.): | Ratio of $Cs_2CO_3$ rate/$K_2CO_3$ rate |
|---|---|
| 1400 | 1.65 |
| 1200 | 2.14 |
| 1100 | 3.00 |
| 1000 | 3.24 |

Therefore, it is clear that at low temperatures cesium carbonate has an activity more than double that of potassium carbonate which is an unexpected result. The reasons for this increased activity are not clearly understood since the catalytic mechanism is not known.

Example IV

The following data are included to demonstrate the superiority of $Cs_2CO_3$—$Li_2CO_3$ and $Cs_2CO_3$—CsCl catalytic mixtures over the best prior known catalyst mixtures.

The catalyst composition was placed in a reactor containing coke and heated to the desired temperature. Steam was then injected into the reactor at a rate of about 1.0 weight of steam per weight of coke per hour. The vessel was maintained at a pressure of about 850 p.s.i.g. The following results were obtained.

TABLE IV

| Molten salt catalyst system | Carbon classification; relative rate ($K_2CO_3$=1.0) | | |
|---|---|---|---|
| | 1,000 °F. | 1,400 °F. | 1,600 °F. |
| 60 mole percent $Na_2CO_3$, 40 mole percent $Li_2CO_3$ | 0.5 | 0.89 | 0.95 |
| 60 mole percent $K_2CO_3$, 40 mole percent $Li_2CO_3$ | 1.0 | 1.00 | 1.00 |
| 60 mole percent $Cs_2CO_3$, 40 mole percent $Li_2CO_3$ | 4.0 | 1.65 | Unstable |
| 60 mole percent $Na_2CO_3$, 40 mole percent CsCl | 0.5 | 0.89 | 0.95 |
| 60 mole percent $K_2CO_3$, 40 mole percent CsCl | 1.0 | 1.00 | 1.00 |
| 60 mole percent $Cs_2CO_3$, 40 mole percent CsCl | 4.0 | 1.65 | Unstable |

As is shown by this data neither $Cs_2CO_3$—$Li_2CO_3$, nor $Cs_2CO_3$—CsCl, performs as well as either the potassium or sodium mixtures when the temperature is about 1600° F. Then surprisingly as the temperature is decreased the cesium mixtures become as much as four times more active as either the sodium or potassium mixtures.

These data demonstrate the superiority of this invention over previously used alkali salt mixtures. It also illustrates the unexpectedness of excellent results achieved in this novel process in light of the prior art teaching that cesium metal salt compounds were poorer gasification catalysts than potassium and sodium salt compounds.

What we claim is:

1. A process for producing a hydrogen-containing gaseous effluent by passing steam through a mixture of carbonaceous material and catalyst in a reaction zone, the improvement which comprises:

operating said reaction zone at superatmospheric pressure and at temperatures between 1000° and 1500° F. wherein said catalyst comprises cesium carbonate.

2. A process according to claim 1 wherein said catalyst comprises a mixture of cesium carbonate and another alkali metal salt compound which mixture is a melt at temperatures below the melting point of $Cs_2CO_3$ at superatmospheric pressures and at temperatures between 1000° and 1500° F.

3. A process according to claim 2 wherein said mixture comprises between 40 and 60 mole percent cesium carbonate and between 40 and 60 mole percent cesium chloride.

4. A process according to claim 2 wherein said mixture comprises between 40 and 60 mole percent cesium carbonate and between 40 and 60 mole percent lithium carbonate.

5. A process for producing a hydrogen-rich gaseous effluent from a carbonaceous material in a reaction zone which comprises:

injecting steam at a rate between 1.0 and 10.0 wt. of steam per atom of carbon per hour into said reaction zone operating at superatmospheric pressures and at temperatures between 1000° and 1500° F. so as to react with said carbonaceous material to produce hydrogen in the presence of a catalyst composition comprising cesium carbonate.

6. A process according to claim 5 wherein said catalyst comprises a mixture of cesium carbonate and another alkali metal salt compound which mixture is a melt at temperatures below the melting point of $Cs_2CO_3$ at superatmospheric pressures and at temperatures between 1000° and 1500° F.

7. A process according to claim 6 wherein said mixture comprises between 40 and 60 mole percent cesium carbonate and between 40 and 60 mole percent cesium chloride.

8. A process according to claim 6 wherein said mixture comprises between 40 and 60 mole percent cesium carbonate and between 40 and 60 mole percent lithium carbonate.

9. A process according to claim 5 wherein said steam is injected into said reaction zone at a rate between 1.0 and 3.0 wt. of steam per wt. of carbon per hour.

References Cited

UNITED STATES PATENTS

| | | | |
|---|---|---|---|
| 3,115,394 | 12/1963 | Gorin et al. | 48—202 X |
| 3,252,773 | 5/1966 | Solomon et al. | 48—202 |
| 3,503,724 | 3/1970 | Benson | 48—202 X |

MORRIS O. WOLK, Primary Examiner

R. E. SERWIN, Assistant Examiner

U.S. Cl. X.R.

48—209, 214; 252—476